Patented Apr. 25, 1939

2,155,914

UNITED STATES PATENT OFFICE 2,155,914

PROCESS FOR THE PREPARATION OF A BLEACHING AND STERILIZING AGENT

Gerrit van der Lee, Deventer, Netherlands, assignor to Naamlooze Vennootschap Industrieele Maatschappij Voorheen Noury & Van Der Lande, Deventer, Netherlands, a company of the Netherlands No Drawing. Application February 23, 1937, Serial No. 127,296. In the Netherlands February 28, 1936

11 Claims. (Cl. 23—190)

The present invention relates to a process for the preparation of a bleaching and sterilizing agent comprising monochloramine ($NH_2Cl$) and dichloramine ($NHCl_2$). The process of the invention may be performed in such a manner that the bleaching and sterilizing agent may be prepared in the form of an aqueous solution containing monochloramine and dichloramine in solution, or the process may be so practiced that the bleaching and sterilizing agent may be prepared in the form of a vapor or gas containing monochloramine and dichloramine.

The liquid or gaseous bleaching and sterilizing agent prepared according to the process of the present invention probably will contain small quantities of other bleaching and sterilizing substances besides monochloramine and dichloramine. Such other substances may be, for example, chlorine, nitrogen trichloride, ammonium hypochlorite, etc. However, the principal or main bleaching and sterilizing substances contained in the bleaching and sterilizing agent or agents, produced according to the present invention, are monochloramine and dichloramine. The chemical reaction underlying the process of the present invention does not take place with the formation of the said chloramines exclusively, but, to some extent, side reactions also take place. In view of these preceding explanations, it is preferred to refer to the content of active chlorine in the product produced by the present process instead of to its content of chloramines. Such active chlorine content may be determined by well known iodometric methods, and is preferably not calculated to chloramines, although monochloramine and dichloramine are the main bleaching and sterilizing substances contained in the product.

According to the present invention, a bleaching and sterilizing agent, or a mixture comprising monochloramine and dichloramine, is prepared by the interaction of ammonia and nitrogen trichloride or a product containing nitrogen trichloride. Also according to the present invention a bleaching and sterilizing agent is prepared by reacting nitrogen trichloride upon a derivative of ammonia such as urea. The reaction or interaction of these materials may advantageously be performed at ordinary room temperature, although the use of temperatures higher than ordinary atmospheric temperatures is not precluded as long as the temperatures employed are not prejudicial to obtaining the chloramines.

It is well known to prepare chloramines by the action of chlorine on ammonia. According to this known process, which is applied to the sterilization of water, ammonia and chlorine are separately dissolved in water, and subsequently the water to be treated is mixed with the aqueous solution of ammonia and the aqueous solution of chlorine. With this known process of sterilizing water there is the difficulty that two substances must be added to or mixed with the water, each of which substances must not only be added in correct quantity to the water but also the exact relative proportions of the added substances must be maintained for effective sterilization. If, for example, the incorrect quantity of chlorine is added, which may arise because of faulty or irregular action of the apparatus controlling the addition of chlorine, the sterilization of the water does not take place in the correct or best manner, although the ammonia may be added in the required quantity. Similarly, variations in the additions of ammonia may be prejudicial to the sterilization of the water. As regards reliability, this known process leaves much to be desired. The process according to the present invention enables the production of a sterilizing agent for water which overcomes the above mentioned objections.

Chloramines and nitrogen trichloride prepared electrolytically have already been suggested for bleaching and sterilizing purposes. According to a known process, water solutions containing monochloramine or dichloramine, or mixtures of them, can be obtained by the electrolysis of a water solution of ammonium chloride, the pH of which has been brought or adjusted to 4.5 to 10. Now it has appeared in practice that the preparation of the chloramines (mono- and dichloramines) according to the said electrolytic process takes place with less good yields per unit quantity of electricity than the preparation of nitrogen trichloride by electrolysis. This is to say, with a given quantity of electricity, nitrogen trichloride may be more efficiently prepared electrolytically than monochloramine or dichloramine or a mixture of such chloramines. The process of the present invention takes advantage of this more efficient yield of nitrogen trichloride by converting the same after production into monochloramine and dichloramine. Nitrogen trichloride may be obtained electrolytically according to the process described above by electrolyzing an acidified solution containing ammonium and chlorine ions.

Since for various purposes, such as, for example, for the treatment of water and sewage, monochloramine and dichloramine are more suitable than nitrogen trichloride, it was of importance to find a process by which the advantages of the electrolytic preparation of nitrogen trichloride were combined with the well known good action of the chloramines (mono- and dichloramines) as treating agents. The process of the present invention solves this problem in that it converts the said nitrogen trichloride into the more desirable chloramines.

According to the present invention nitrogen trichloride may be successfully converted with a very good yield into a bleaching and sterilizing agent, mainly consisting of chloramines, by causing nitrogen trichloride to act on ammonia. By the usual methods of preparation, nitrogen trichloride is obtained as a gaseous mixture with air, in which the air is present in a great excess in respect to the nitrogen trichloride. If such a gas containing nitrogen trichloride is conducted into a dilute water solution of ammonia, a bleaching and sterilizing agent is formed according to the process of the present invention.

In addition, the process of the present invention has the advantage that chlorine which might be present in the gas mixture containing nitrogen trichloride is likewise converted into chloramines, and thereby such chlorine acquires an increased activity, since in various respects chlorine is less suitable for treating water than the chloramines. If desired, the air coming from the solution of ammonia may again be conducted into the apparatus for the preparation of nitrogen trichloride. According to this latter procedure any ammonia carried in the air is not lost but is bound by the acid constituents that are normally present in the electrolyte used for the preparation of nitrogen trichloride electrolytically.

The process according to the invention is, however, neither limited to a special method for the electrochemical production of the nitrogen trichloride, nor to electrochemical production generally. Any suitable electrochemical method of production of nitrogen trichloride may be employed. It is also possible to prepare nitrogen trichloride used in the present invention in the chemical way, for example, by the action of chlorine or of hypochlorous acid on a solution of an ammonium salt.

Also according to the present invention, the ammonia may be wholly or partly substituted by urea. If, for example, the gas containing nitrogen trichloride, which is obtained by the electrolysis of an acidified ammonium chloride solution, is conducted through a water solution of urea of 1% strength, the nitrogen trichloride is bound and the solution of urea acquires strongly sterilizing properties.

Instead of a water solution of ammonia, ammonia in the form of vapor, preferably in the presence of moisture, may be allowed to act with nitrogen trichloride, or with air or other gas containing nitrogen trichloride.

The process according to the invention is particularly useful in those cases where one can apply both nitrogen trichloride and chloramines. This is, for example, the case in mills for grinding grain. In these mills the water for washing grain, and especially for washing wheat, must be of good quality in view of the desired keeping quality of the grain products. If no water of good hygienic quality is available, then available water of poor or inferior hygienic quality may be treated with the bleaching and sterilizing agent produced according to the present invention. On the other hand, nitrogen trichloride is used for improving the color and the baking quality of the flour. Now, according to the present invention it is possible to carry out both treatments with a single apparatus for producing nitrogen trichloride. One only has to conduct the gases from the apparatus for the production of nitrogen trichloride into two pipes, one of which goes direct to the mill, i. e., to the place where the flour is to be treated and the second of which discharges into a vessel where the gases are contacted with a dilute water solution of ammonia. In this vessel the sterilizing agent is formed, and it may then be used for the treatment of the water for the wheat washing department.

Methods and directions that have been followed for the treatment of various products with chloramines may also be followed in using the bleaching and sterilizing agents produced according to the invention for similar purposes. The quantities of active chlorine that must be applied for the treatment of water, are, for example, as large as with the process according to which ammonia and chlorine are conducted into the water separately.

These quantities of active chlorine fluctuate depending on the composition and the impurities of the water, the time of action, etc., and must, therefore, be determined for each case separately. Also, for the treatment of other products, such as, for example, flour and the like, such quantities of the bleaching and sterilizing agents prepared according to the invention are used as correspond with those that are applied for chloramines prepared in a different way. The addition of the bleaching agent to the flour is best effected by spraying the liquid, for example, according to the Humphries process.

The following example will serve to illustrate the process of preparing the bleaching and sterilizing agents according to the invention. From the foregoing description it will be appreciated that modifications of this following example may be made without departing from the invention.

*Example*

In a bottle having a wide neck an electrolyte containing per 2000 ccm. of water, 25 g. of ammonium chloride, 475 g. of sodium chloride and 25 ccm. of hydrochloric acid, specific gravity 1.19, is electrolyzed with a current strength of 1.25 amperes. Two graphite rods of 5 mm. diameter placed at a distance of 10 mm. from each other are used as electrodes. During the electrolysis air is blown through the electrolyte to carry away the volatile reaction products formed. According to an analysis 0.556 g. of nitrogen trichloride and 0.126 g. of chlorine were formed per ampere hour. The gases are conducted into a mixture of 5 ccm. of ammonia, specific gravity 0.91 and 300 ccm. of water. After one ampere hour has passed through the electrolyte, the absorption liquid contained, according to an iodometric titration, 0.469 g. of active chlorine.

The content of active chlorine in the reaction liquid may be further increased by continuing the introduction of nitrogen trichloride containing air. One must, of course, take care that a sufficient concentration of ammonia is present, as otherwise no complete conversion can take place. If required, ammonia is added during the preparation, either continuously or periodically. It is of importance, however, to keep the concentration of ammonia as low as possible consistent with a good absorption, as otherwise the air flowing through the absorption apparatus may carry ammonia with it. Preferably, care is taken that the contact of the gas with the ammonia solution is as intimate as possible.

It is also possible to carry out the preparation of the bleaching and sterilizing agent continuously, for example by making use of an absorption tower in which the solution of ammonia enters at the top and from which the bleaching and sterilizing agent is drawn off at the bottom. The air mixed with nitrogen trichloride accordingly enters into the absorption tower at the bottom and is carried away at the top after having been freed from nitrogen trichloride by the ammonia solution.

I claim:

1. Process of preparing a bleaching and sterilizing agent which comprises reacting ammonia with preformed nitrogen trichloride produced out of contact with said ammonia.

2. Process for preparing a bleaching and sterilizing agent which comprises reacting ammonia with a material containing preformed nitrogen trichloride produced out of contact with said ammonia.

3. Process for preparing a mixture of monochloramine and dichloramine which comprises reacting ammonia with preformed nitrogen trichloride produced out of contact with said ammonia.

4. Process for preparing monochloramine and dichloramine which comprises reacting an aqueous solution of ammonia with nitrogen trichloride product out of contact with said aqueous solution of ammonia.

5. Process for preparing monochloramine and dichloramine which comprises reacting gaseous ammonia with preformed nitrogen trichloride produced out of contact with said gaseous ammonia.

6. Process for preparing a mixture containing monochloramine and dichloramine which comprises reacting preformed gaseous nitrogen trichloride with gaseous ammonia, said gaseous nitrogen trichloride being produced out of contact with said gaseous ammonia.

7. Process for preparing a mixture containing monochloramine and dichloramine which comprises reacting preformed gaseous nitrogen trichloride with an aqueous solution of ammonia, said gaseous nitrogen trichloride being produced out of contact with said aqueous solution of ammonia.

8. Process for preparing a mixture containing monochloramine and dichloramine which comprises preforming nitrogen trichloride and reacting such nitrogen trichloride with ammonia to form a mixture containing monochloramine and dichloramine, the said nitrogen trichloride being produced out of contact with said ammonia.

9. Process for preparing a mixture containing monochloramine and dichloramine which comprises preparing nitrogen trichloride by electrolyzing an aqueous solution containing ammonium and chloride ions, removing electrolytically formed nitrogen trichloride from said solution, and, then reacting such nitrogen trichloride with ammonia to form a mixture containing monochloramine and dichloramine.

10. Process for preparing a mixture containing monochloramine and dichloramine which comprises preparing nitrogen trichloride by electrolyzing an aqueous solution of acid reaction containing ammonium and chloride ions, the acidity of the said solution being greater than the normal acidity of water solutions of ammonium chloride, removing electrolytically formed nitrogen trichloride from said solution and, then reacting such nitrogen trichloride with ammonia.

11. Process for producing a bleaching and sterilizing agent which comprises subjecting an aqueous solution containing ammonium and chloride ions to electrolysis to form nitrogen trichloride, collecting such nitrogen trichloride as a product of the said electrolysis and reacting it with ammonia to form a chlorine substitution product of ammonia.

GERRIT VAN DER LEE.